(No Model.)
W. H. CHILMAN.
BASKET COVER.
No. 443,568. Patented Dec. 30, 1890.
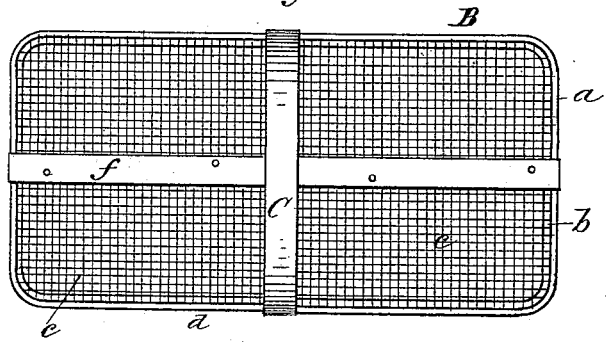
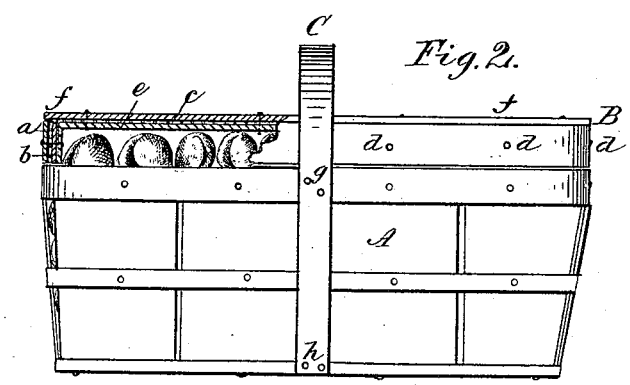
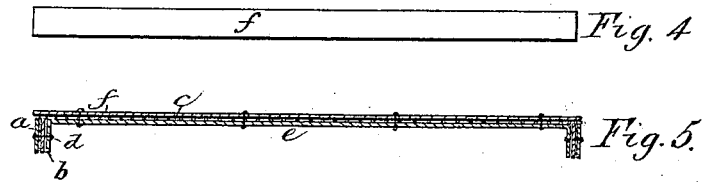
Witnesses
A. E. Jones
W. Acres
Inventor
W. H. Chilman
By W. Bruce
Att'y

UNITED STATES PATENT OFFICE.

WILLIAM HENRY CHILMAN, OF WALKERVILLE, ONTARIO, CANADA.

BASKET-COVER.

SPECIFICATION forming part of Letters Patent No. 443,568, dated December 30, 1890.

Application filed April 4, 1890. Serial No. 346,621. (No model.)

*To all whom it may concern:*

Be it known that I, WILLIAM HENRY CHILMAN, book-keeper, of Walkerville, in the county of Essex, in the Province or Ontario, Dominion of Canada, have invented certain new and useful Improvements in Fruit Baskets and Packages; and I do hereby declare that the following is a full, clear, and exact description of the construction and operation of the same.

The device relates to a very handy, safe, and convenient cover for fruit baskets and packages, constructed in such a manner that when filled the contents will be completely covered, preventing pilfering of the fruit yet exposing it to view, and which will also possess the advantage of cross-piling in transit with safety, while fruit shipped in ordinary packages would be more or less damaged by same.

My invention consists in forming a cover with a double hoop or band around the entire circumference, between which is placed a body of leno, tarlatan, or equivalent netting, and re-enforced with a double-brace slat consisting of a bridge on the under side attached to the inner hoop or band, and a top slat fastened to the lower bridge, making a double brace with the leno or other material between them capable of sustaining a heavy weight. The netting-cloth is held tight around all sides of the cover, the two hoops or bands forming its sides being tacked together with the netting between them, the whole cover being made firm and strong yet very neat in appearance and capable of displaying the fruit to advantage.

By reference to the annexed drawings, forming part of this specification, it will be seen that Figure 1 is a plan of my cover. Fig. 2 is a side view of basket and cover. Fig. 3 is a side view of bridge and top brace-slat. Fig. 4 is a plan view of top brace. Fig. 5 is a longitudinal section of bridge, top brace, and cover.

A represents a fruit-basket formed of thin pieces of wood in the usual manner; B, the cover, consisting of the outer bent hoop $a$ and an inner one $b$ of the same shape closely fitting it, with the protecting-netting $c$ of leno, tarlatan, wire-netting, or equivalent material held between the external and internal hoops, stretching it horizontally over the top of the cover tight all around the edges, the hoops being fastened by tacks $d$. The bridge $e$ is bent at right angles at each end and fastened to the inner hoop or band $b$, the netting being over it.

$f$ is the top slat, secured to the top of the bridge, as shown at Fig. 5.

C represents the handle, tacked to the top at the point $g$ and at the bottom to a horizontal strip (of which there are three) at the point $h$, rendering the entire basket and cover strong, durable, and affording ample protection against pilfering and bruising in transportation.

Having thus described my device and its advantages, what I claim as my invention, and desire to secure by Letters Patent, is—

The combination, with a fruit basket or package, of the cover B, constructed of the double hoop or band $a\ b$, the covering of leno, tarlatan, wire-netting, or equivalent material, having its edges secured between said hoops, the re-enforcing bridge $e$, secured to the inner hoop, and the slat $f$, fastened to the upper side of the bridge outside of the fabric of the cover, all constructed and arranged substantially as and for the purpose specified.

Dated at Hamilton, Ontario, Canada, this 18th day of February, A. D. 1890.

WILLIAM HENRY CHILMAN.

In presence of—
WILLIE NASH,
WM. BRUCE.